July 12, 1927.

N. E. BRAY

ANCHORING STAKE

Filed Aug. 25, 1926

1,635,923

Norris E. Bray
INVENTOR

BY Victor J. Evans
ATTORNEY

Patented July 12, 1927.

1,635,923

UNITED STATES PATENT OFFICE.

NORRIS E. BRAY, OF ARGYLE, WISCONSIN.

ANCHORING STAKE.

Application filed August 25, 1926. Serial No. 131,471.

My present invention has reference to anchoring stakes designed for holding the lower strands of wire fences in close relation to the ground, for serving as an anchor for guy ropes, wires, as a tent stake and for any other like purposes, and the object is the provision of an anchoring stake that includes a shank having an outer hooked or rounded end and its opposite end widened and formed with a fluke of a particular and peculiar formation so that the fluke, when forced into the ground will turn, thus burying itself in the ground and effectively anchoring the stake, while a reverse turning or screwing of the fluke permits of the same being readily removed when occasion requires.

To the attainment of the foregoing the improvement resides in the construction, combination and operative association of parts, a satisfactory embodiment of which is disclosed by the accompanying drawings.

Figure 1:
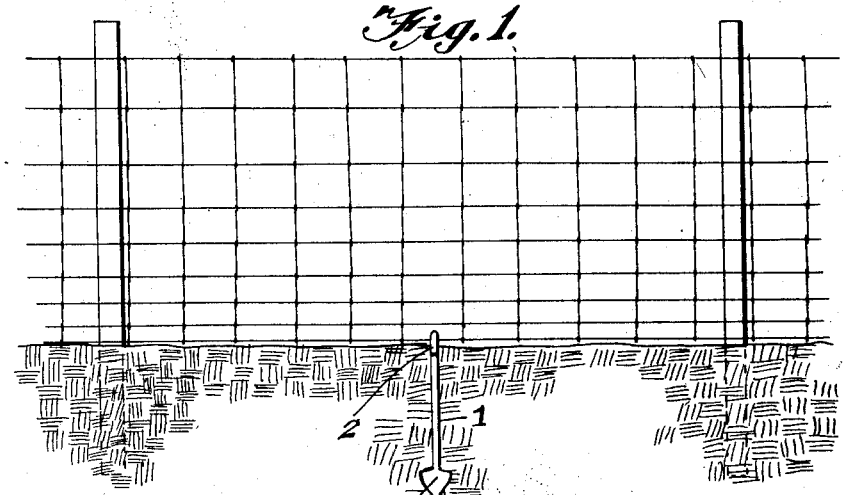
Figure 1 is an elevation to illustrate the manner in which the improvement may be employed for holding the lower longitudinal strand of a wire fence in close proximity to the ground for preventing hogs or like animals from passing from one to another field.
Figure 2:
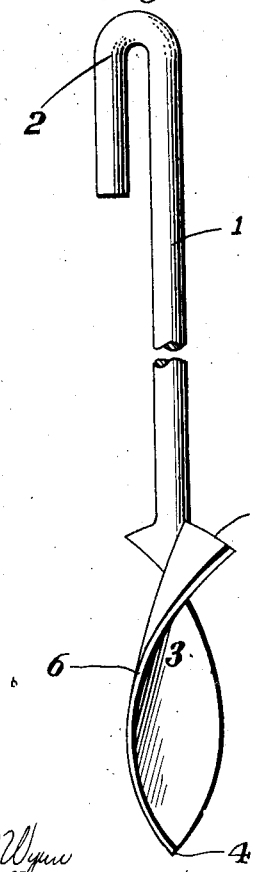
Figure 2 is a side elevation of the improvement.
Figure 3:
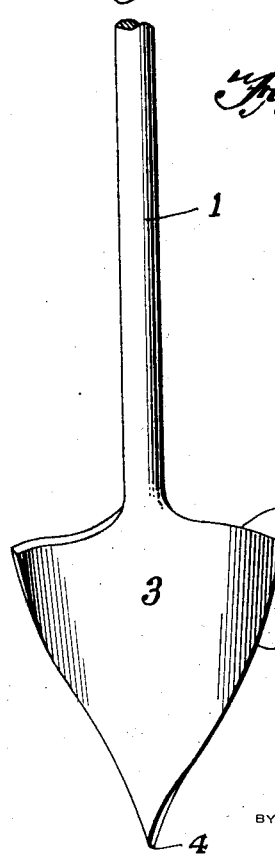
Figure 3 is a plan view of the lower portion thereof.
Figure 4:
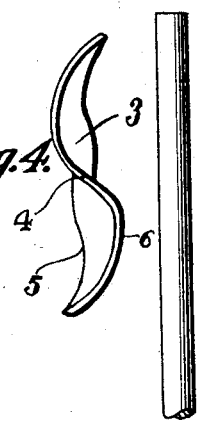
Figure 4 is an end view looking toward the fluke end of the improvement.

While in Figure 1 of the drawings I have illustrated my improvement employed as holding the lower strand of a wire fence in close proximity to the ground surface, it is, of course, to be understood that the invention is not to be thus restricted in its useful capacity as the same can be successfully employed as an anchor for other devices, such as guy ropes or wires or as a tent stake, etc.

Figure 5:
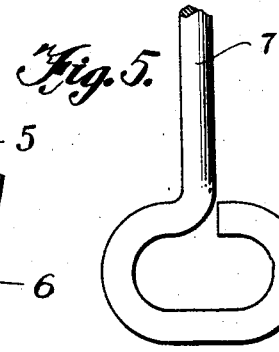
Figure 5 is a view of the tamping rod which may be employed.

The improvement comprises a shank 1 which is preferably round in cross section and which shank in the showing of the drawings has one of its ends rounded to provide the same with a hook 2. The second end of the shank is flattened and widened to form the same with a triangular or substantially V-shaped portion that is twisted to provide a fluke 3. The peak or bill 4 of the fluke is arranged in a line with the axial center of the shank 1 and the sides of the fluke are curved or rounded in opposite directions from the said peak to the upper edges 5 of the fluke. The curved edges of the sides are indicated by the numeral 6, and the upper edges 5 of the fluke are rounded in opposite directions from their connections with the shank 1. By such arrangement it is to be noted that the fluke is of auger-like formation so that the same can be easily forced into the ground and by virtue of contact with the sub-soil the said fluke will automatically turn or revolve, thus firmly embedding itself in the ground. The loose earth may be tamped around the shank by a rod 7 illustrated in Figure 5 of the drawings and after the device is firmly planted, the elements to be sustained thereby are engaged by the hooks or rounded outer end of the shank. When it is desired to remove the stake it is merely necessary to insert the rod 7 in the hook or rounded end 2 and turn the device which will cause the unscrewing thereof through the ground.

The improvement may be readily inserted in the ground and easily removed therefrom as will, it is thought, be apparent, which obviously is of great advantage to farmers who find it necessary to move their fences and to tourists who frequently change their camps, while, of course, the stake may remain permanently fixed in the ground if desired.

Having described the invention, I claim:—

An anchoring stake comprising a cross sectionally rounded shank having one of its ends rounded to provide a hook and its opposite end flattened and widened to provide a substantially triangular fluke, the bill of the fluke being arranged in a line with the axial center of the shank, the sides of the fluke being rounded in opposite directions from the fluke and the upper ends of the fluke being rounded from the shank to the sides of the said fluke.

In testimony whereof I affix my signature.

NORRIS E. BRAY.